2,976,447

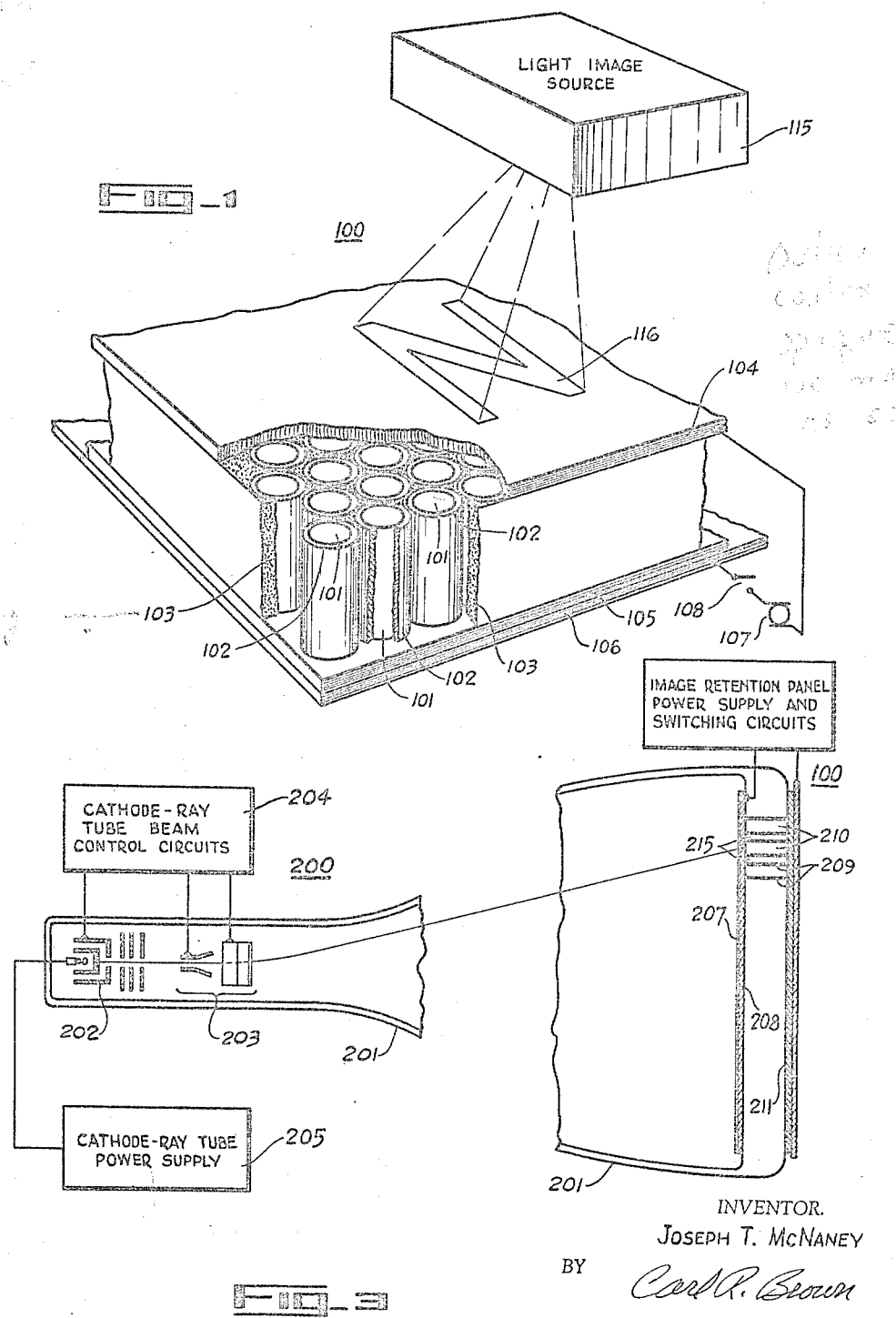

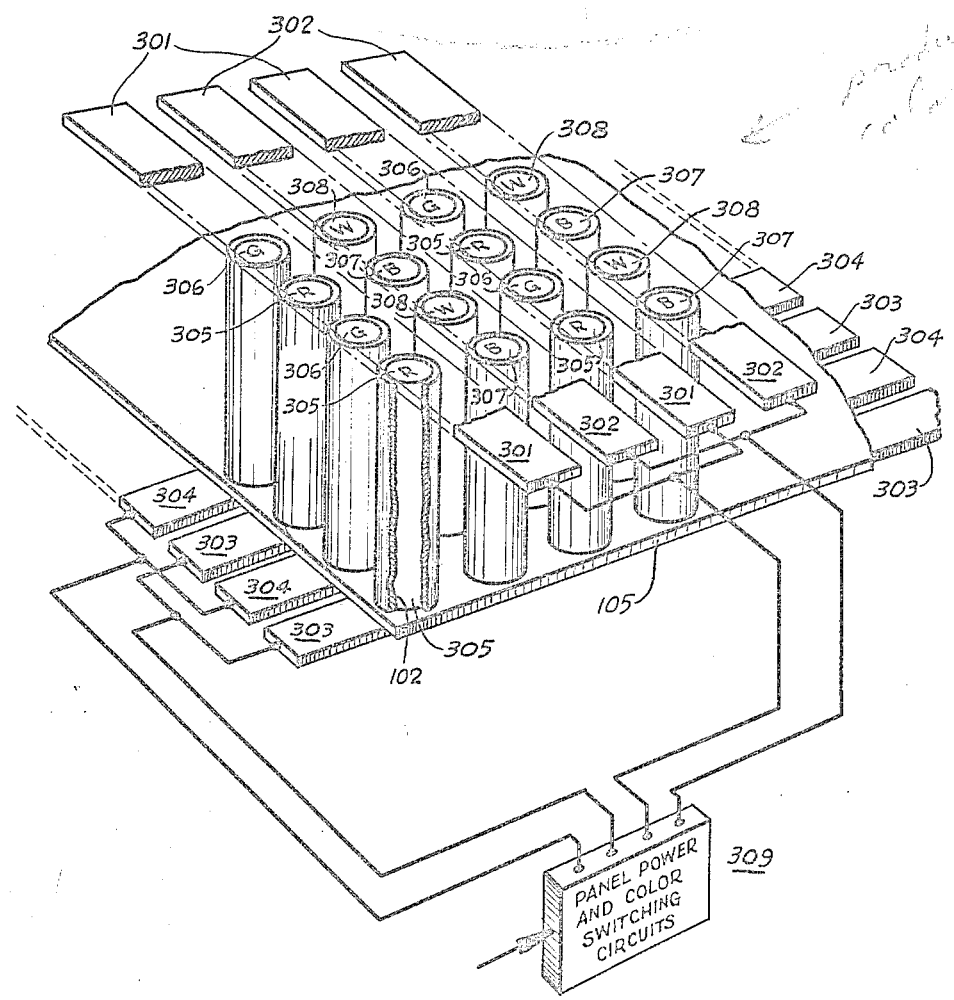
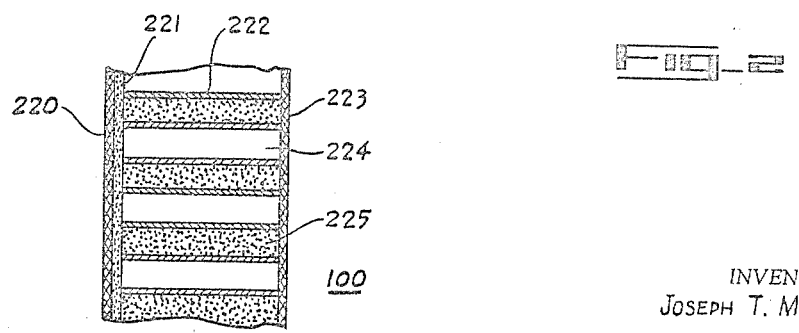

IMAGE STORAGE APPARATUS

Joseph T. McNaney, La Mesa, Calif., assignor to General Dynamics Corporation, Rochester, N.Y., a corporation of Delaware Filed Mar. 12, 1959, Ser. No. 798,983

4 Claims. (Cl. 313—108)

This invention relates to an image storage apparatus capable of displaying images and more particularly to an array of light-generating storage elements each capable of being independently triggered into sustained illumination by an impinging light ray.

The invention fulfills the need for an image retaining and display device—hereinafter designated a storage panel—which has a resolution capability of approximately 500 or more bits per lineal inch. The storage panel of this invention is inherently strong enough to serve without auxiliary structural support as both the screen and faceplate in an evacuated envelope such as a cathode-ray tube. Optical efficiency is greater than prior art image storage apparatus which require an image to pass through a separate supportive structure. The image may be stored and displayed in any of several predetermined colors to differentiate separate channels of input information: i.e., an impinging image of white light may be stored in red, green, blue, or white, for example. Advantages of this invention will become apparent from the following description, particularly when considered in connection with the drawing, wherein:

Figure 1 is a cutaway view of the invention in the form of a panel for storing and displaying photic images;

Figure 2 is a cutaway view of the invention embodied in a storage panel capable of retaining an image in one of several pre-determined colors;

Figure 3 is a schematic showing of a cathode-ray tube having a storage panel representative of the storage panels of either Figure 1 or Figure 2 activated by cathode-ray images; and Figure 4 is a modification of the storage panel for use in the cathode-ray tube of Figure 3.

With reference to Figure 1, a portion of a storage panel 100 is shown in a cutaway view. The basic structure is an array of a plurality of light responsive current transferring units. Each unit includes a light guide 101, which may be an optical fiber made of glass, quartz, plastic or other transparent or selectively transparent substances. Each fiber has a characteristic spectral transmittance; i.e., low absorption over a suitable portion of the photic spectrum, as in a color filter. N. S. Kapany discusses the field of fiber optics comprehensively in Appendix N (pages 553 to 579) of a book published by W. H. Freeman and Company, San Francisco, entitled "Concepts of Classical Optics," by J. Strong. An image 116 cast or projected by a light image generating unit 115 onto the surface comprising one end of a bundle of individual optical fibers appears on the opposite surface as a mosaic image. The individual fibers 101, which can be as small as one or two thousandths of an inch in diameter, establish the size of the bits comprising the mosaic.

Fiber optics normally comprise glass fibers clad with an optical glass of lower refractive index to favor internal reflection and thus minimize transmission losses through the side walls. In the present invention, however, the optical fibers 101 are clad with an opaque photoconductive medium 102 that is absorptive to impinging rays of light. Figure 1 shows individual fibers 101 having transverse end and a longitudinal surface, with a surface deposition or coating of a photoconductive material 102 such as selenium. While other photoconductive materials may be used and still be within the scope of the invention, the use of selenium offers two advantages over other photoconductive materials. It can be deposited on the fibers from a vaporous state, and in a vacuum-tube device it is less of a cathode contaminant than other photoconductive materials. The coating is added prior to assembly of the fibers into a bundle. Each coated fiber serves as a separate variable resistance element in an auxiliary circuit for generating light by means of electroluminescence. Light impinging on either end of the transparent optical fiber impinges on the fiber walls through diffraction, refraction, reflection and scattering within the fiber. The opaque or semi-opaque photoconductive coating 102 absorbs a portion of the light at each point of reflection. Therefore the proportion of incident light absorbed by the photoconductive coating is a function of the relative length of the fiber. Light absorption by the photoconductor increases with the thickness of the array of fibers in the direction of the fiber lengths. The absorbed light energy lowers the resistance of the photoconductive coating 102.

The array is impregnated with a binder or filler material 103 that may be glass or other impervious material having a relatively low melting point, high electrical resistance, high mechanical strength and any desired degree of opacity. The binder cements the fibers into a solid, hermetically sealed panel and serves as an electrical and photic insulator between fibers. The resultant panel is suited for use as the faceplate in a cathode-ray tube, since it is airtight and strong enough to withstand safely a continuous pressure differential of well over one atmosphere.

The ends of the fibers form collectively two surfaces essentially perpendicular to the fibers. A first conductor 104, which may consist of a thin film of light-transparent, electrically conductive material such as a tin compound, is deposited in a continuous layer on one surface hereinafter designated as the transparent surface. The first conductor 104 makes electrical contact with each photoconductor 102. A layer of electroluminescent material 105 of the type which emits light when subjected to a varying electric field is deposited in a continuous layer on the other surface. A second conductor 106, which may be transparent to light, is deposited in a continuous layer on the outer surface of the electroluminescent layer 105.

The first and second conductors 104 and 106 are connected to opposite terminals of an external power supply and power control circuit comprising a source of varying potential such as an alternating or interrupted-direct potential 107 in series with a means for controlling the application of that potential, such as an On-Off switch 108.

The apparatus operates as follows. Switch 108 is closed, resulting in the application of voltage across the storage panel 100, but there is no visible effects as long as the panel remains in darkness. When a light image 116 is momentarily projected onto the transparent surface 104 of the storage panel by light source 115, those photoconductors that receive rays of light from the image become conductive. Those portions of the electroluminescent phosphor sandwiched between the second conductor 106 and the conductive photoconductors 102 emit light as the result of the applied voltage. Light feedback within the illuminated fibers maintains low resistance in the respective photoconductors. After removal of the initiating light image, the light feedback keeps the stored image displayed indefinitely, or until the power-supply switch 108 is thrown to Off.

The storage panel 100 as shown in either Figure 1 or Figure 2, may be constructed as a target in a cathode-ray tube, as shown schematically in Figure 3. Cathode-ray tube 200 comprises an evacuated envelope 201 with an electron gun 202 at one end and a target storage panel 100 at the other end. The target storage panel 100 serves both as an electron responsive screen and as a faceplate for the cathode-ray tube envelope 201. Deflection means 203 are located intermediate the electron gun 202 and the target storage panel 100. External circuitry includes appropriate beam control and deflection circuits 204, a cathode-ray tube power supply 205, and power-supply and switching circuits 206 associated with the target storage panel 100. The transparent electrical conductor 208 that coats the surface of the storage panel 100 may be in turn coated with an electron responsive phosphor 207 and the panel oriented so that the added phosphor faces the electron beam. The phosphor layer 207 generates light in light fibers 219 held in the panel by binder material 215, causing illumination of photoconductive material 209 in response to the impact of electrons. The lowered resistance of the photoconductor causes the electroluminescent layer 211 to be excited and thereupon to generate light. The resultant light image is stored as hereinbefore described in Figure 1, as well as the panel to be described in Figure 2. Erasure of the stored image is effected by momentarily breaking the voltage to the conductors 208 and 212, by means of the external switching circuits 206.

Alternatively the electroluminescent layer may be exposed to impinging cathode rays by turning the panel about so that the electroluminescent layer lies in the interior of the tube facing the cathode. In the modification of the target screen shown in a partial enlarged section in Figure 4, a conductive coating 220 transparent to electrons but which is capable of conducting electrical energy, is deposited on the surface of the electroluminescent layer 221. A suitable electron transparent coating may be a coating of evaporated aluminum. The electron beam, when striking the electroluminescent layer 221 through coating 220, will cause it to illuminate. This in turn illuminates light fibers 224, illuminating the photoconductive coating 222. Accordingly, the varying potentials on the conductive coatings 220 and 223 are provided a path through the illuminated photoconductive material causing current to flow through the electroluminescent material and maintaining it in the illuminated condition thereby affording the storage effect. The fibers are secured into a unit by binder material 225.

Storage panels of this invention may be fabricated from a variety of colored fibers. Employed as the target screen and faceplate of a cathode-ray tube, a storage panel comprising a repetitive pattern of red, green, and blue rows of colored fibers may be used to store and display characters in any of the three colors. By feeding color information to the deflection system of the tube, the cathode-ray beam in normal cathode-ray tube operation may be made to impinge on selected rows as it sweeps the storage panel. A colored image will then result from the impinging of the electron beam, which image may be stored and displayed by the panel in a correspondingly colored mosaic.

A storage panel comprising colored fibers coordinated in lateral and longitudinal rows as shown in Figure 2, may be employed as the target and faceplate in an ordinary cathode-ray tube or in a shaped beam cathode-ray tube of the type described fully in U.S. Patent No. 2,811,668. In the shaped beam type of tube, the shaped electron beam as described in the aforesaid patent may simultaneously impinge on a plurality of fibers encompassing all of the component colors, but the displayed color and storage color may be selected by feeding color information to the target storage panel through a series of light-transparent conductor grids. Figure 2 shows a fractional cutaway view of a storage and display panel comprising a tetracolored orthogonal pattern of fibers. Conductors may be etched or otherwise formed into parallel strips as wide as the diameter of the fibers and appropriately connected to switching means. If one or more of the colored fibers or groups of fibers is selectively activated through appropriate conductive strips, a character shaped beam impinging on the colored pattern of fibers may be stored and displayed in any one predetermined color or combination of colors.

In the embodiment shown in Figure 2, alternate strips 301 are activated in parallel, as are alternate strips 302, strips 303, and strips 304. The strips 301 and 302 on the one surface are orthogonal with those (303 and 304) on the second. The fibers may be in an orderly arrangement such that each fiber coincides with the crossover area of conductors on opposite sides of the panel. Two or more fibers may fall within a single crossover area if the fiber diameter is much smaller than the width of the conductive grids. Each strip on the transparent surface makes electrical contact with one end of the photoconductive coating on either a single row or an integral number of rows of fibers. Each strip on the second surface is adjacent the photoconductive coatings on either a single row or an integral number of rows of fibers orthogonal to the rows on the transparent surface. The color pattern of the fibers may be as shown in the figure. In this embodiment the four groups of colored fibers are shown as red 305, green 306, blue 307, and white 308. It should be understood however that any number of color groups may be appropriately combined into a repetitive array. The conductive strips are electrically connected to appropriate switching means in the panel power and color switching circuits 309. Only those elements sandwiched between strips on opposite sides of the storage panel which are connected to the external voltage source are capable of storing impinging image bits. The use of colored fibers and the etching or other forming of the conductive electrodes into strips in no way detracts from the structural strength of the panel.

Although this invention has been described with reference to particular embodiments, it is to be understood that these are given only as examples, and numerous changes in the arrangements of the elements comprising the fiber storage panel may be made without departing from the spirit and scope of the invention.

I claim:

1. In an image storage apparatus, a plurality of optical fibers arranged in an array, each of said fibers having a longitudinal surface and transverse ends, at least a portion of said longitudinal surface having a coating of photoconductive material substantially extending between said ends and in contact with the coating of the adjacent optical fibers of the array, a substantially continuous conductor layer making electrical contact with one of the transverse ends of the array and the coating of photoconductive material substantially extending to said one transverse end, an electroluminescent layer in contact with the other transverse ends of the array of optical fibers and the coating of photoconductive material substantially extending to said other transverse end, and means for securing said optical fibers into said array.

2. The combination comprising: a bundle of optical fibers of material having good light-transmitting characteristics; a sleeve of photoconductive material positioned in contiguous circumjacent relation with each of said fibers and in contact with the coating of the adjacent optical fiber of the bundle; a source of potential having two terminals, a substantially continuous conductor layer making electrical contact with an end of said sleeves and the adjacent end of said fibers, and connected to one of said terminals; an electroluminescent layer making electrical contact with the other end of said sleeves and the adjacent end of said fibers, and connected to the other of said terminals; whereby light traversing said rod illuminates the inner surface of said sleeve and reduces the electrical resistance thereof, thus permitting said potential to be applied through said sleeve to any desired element.

3. A display of the storage type comprising: a plurality of optical fibers positioned in a bundle-like array; sleeves of photoconductive material positioned in contiguous circumjacent relation with respective said rods and in contact with adjacent sleeves thereto; a source of potential having two terminals; a continuous electrical connection between one of said terminals and one end of each of said sleeves; a layer of electroluminescent material positioned with one surface thereof across the end of each said rod and sleeve combination; a connection between the other said terminal and the other surface of said layer—whereby incident light traversing selected said rods illuminates the inner surface of selected said sleeves and reduces the electrical resistance thereof, thus applying said potential across portions of said electroluminescent layer to cause them to glow, the optical feedback from said electroluminescent material illuminating the inner surface of the sleeves surrounding said selected fibers to maintain them in their low resistance state and thus cause said portions of said electroluminescent layer to continue to glow.

4. The combination of claim 3 including means producing a pattern of incident light.

References Cited in the file of this patent

UNITED STATES PATENTS 2,773,992   Ullery _____ Dec. 11, 1956

OTHER REFERENCES

Bramley: "Transient Voltage Indicator and Information Display Panel," Review of Scientific Instruments, June 1953, pages 471 and 472.

Notice of Adverse Decision in Interference

In Interference No. 93,975 involving Patent No. 2,976,447, J. T. McNaney, Image storage apparatus, final judgment adverse to the patentee was rendered June 19, 1964, as to claim 1.

[*Official Gazette August 25, 1964.*]